US012219313B2

(12) United States Patent
Ahn et al.

(10) Patent No.: US 12,219,313 B2
(45) Date of Patent: Feb. 4, 2025

(54) ELECTRONIC DEVICE

(71) Applicant: LG ELECTRONICS INC., Seoul (KR)

(72) Inventors: Youngjin Ahn, Seoul (KR); Kyoungsu Nam, Seoul (KR); Donghan Kim, Seoul (KR); Sungwon Kim, Seoul (KR); Junyoung Park, Seoul (KR); Obyoung Kang, Seoul (KR); Juchul Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 17/791,158

(22) PCT Filed: Jan. 30, 2020

(86) PCT No.: PCT/KR2020/001446

§ 371 (c)(1),
(2) Date: Jul. 6, 2022

(87) PCT Pub. No.: WO2021/141173

PCT Pub. Date: Jul. 15, 2021

(65) Prior Publication Data

US 2023/0007379 A1 Jan. 5, 2023

(30) Foreign Application Priority Data

Jan. 6, 2020 (KR) ........................ 10-2020-0001644

(51) Int. Cl.
*H04R 1/10* (2006.01)

(52) U.S. Cl.
CPC ......... *H04R 1/1016* (2013.01); *H04R 1/1058* (2013.01); *H04R 2420/07* (2013.01)

(58) Field of Classification Search
CPC ................ H04R 1/10; H04R 1/12; A61L 2/10
See application file for complete search history.

(56) References Cited

U.S. PATENT DOCUMENTS 8,837,714 B1 * 9/2014 Chen ........................ H04R 1/12
379/439
10,251,962 B2 * 4/2019 Hann ........................ A61L 2/10
(Continued)

FOREIGN PATENT DOCUMENTS

CN 206894268 U * 1/2018
CN 208241838 U * 12/2018
(Continued)

OTHER PUBLICATIONS

"Inair Ergonomics Ear Speaker [M360] & [M360bt]", youtube(URL: https://youtu.be/z7o0b_-TFpo?t=40), May 8, 2018>.
(Continued)

*Primary Examiner* — Ryan Robinson
(74) *Attorney, Agent, or Firm* — Birch, Stewart, Kolasch & Birch, LLP

(57) ABSTRACT

An electronic device is disclosed. The electronic device according to the present disclosure includes a body, a neck formed at one side of the body, and a head formed on the neck, wherein the head comprises: a circular part connected to the neck; a protrusion part protruding from one side of the circular part and having a curvature that is greater than a curvature of the circular part; a speaker hole formed at at least one of the circular part and the protrusion part; and a band part formed at the periphery of the speaker hole, and the thickness of the band part may be greater than the thickness of the circular part or the protrusion part around the band part.

12 Claims, 15 Drawing Sheets

(56) References Cited

U.S. PATENT DOCUMENTS

| | | | | |
|---|---|---|---|---|
| 11,882,407 | B2 * | 1/2024 | Kheraj | H02J 7/0044 |
| 2020/0353110 | A1 * | 11/2020 | Persson | A45C 11/00 |

FOREIGN PATENT DOCUMENTS

| | | | | |
|---|---|---|---|---|
| CN | 209882008 | U | * | 12/2019 |
| KR | 20120117522 | A | * | 10/2012 |
| KR | 20140086631 | A | * | 7/2014 |
| KR | 20-0477805 | Y1 | | 7/2015 |
| KR | 10-2016-0147498 | A | | 12/2016 |
| KR | 10-2019-0104122 | A | | 9/2019 |
| WO | WO-2020227771 | A1 | * | 11/2020 |

OTHER PUBLICATIONS

Philips Flite™ Headphones SHL4805, SHE4205, SHL4600 | Philips Sound, youtube(URL: https://youtu.be/bxbn8QfFg_M?t=46), Mar. 9, 2017>.

* cited by examiner

[FIG. 1]
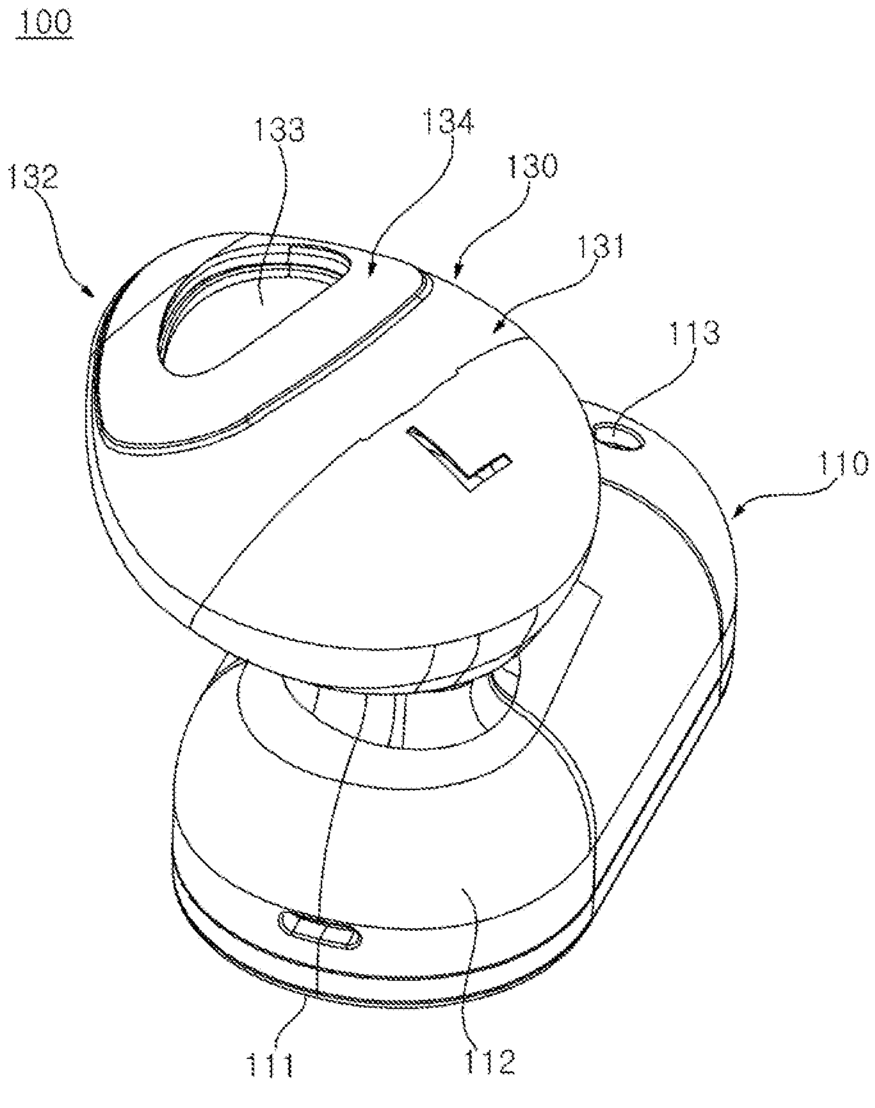

[FIG. 2]
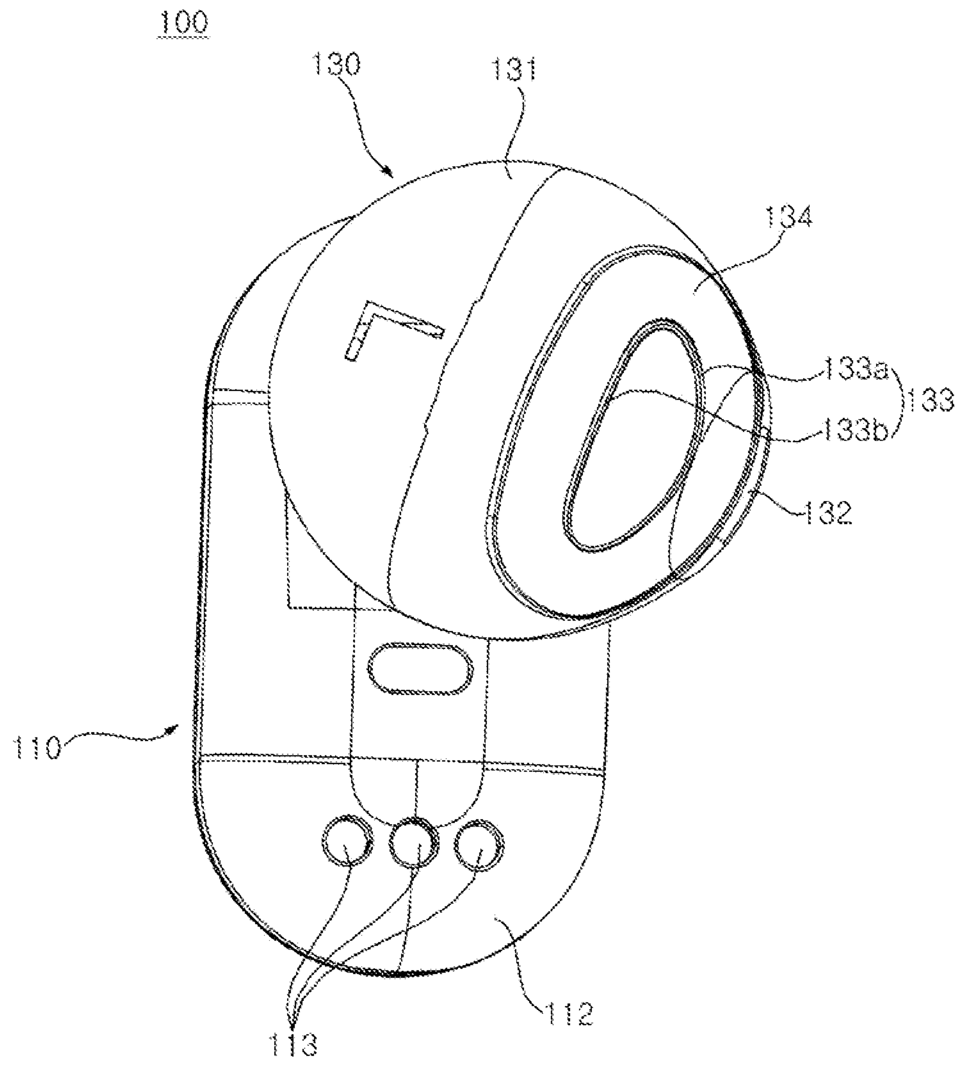

[FIG. 3]
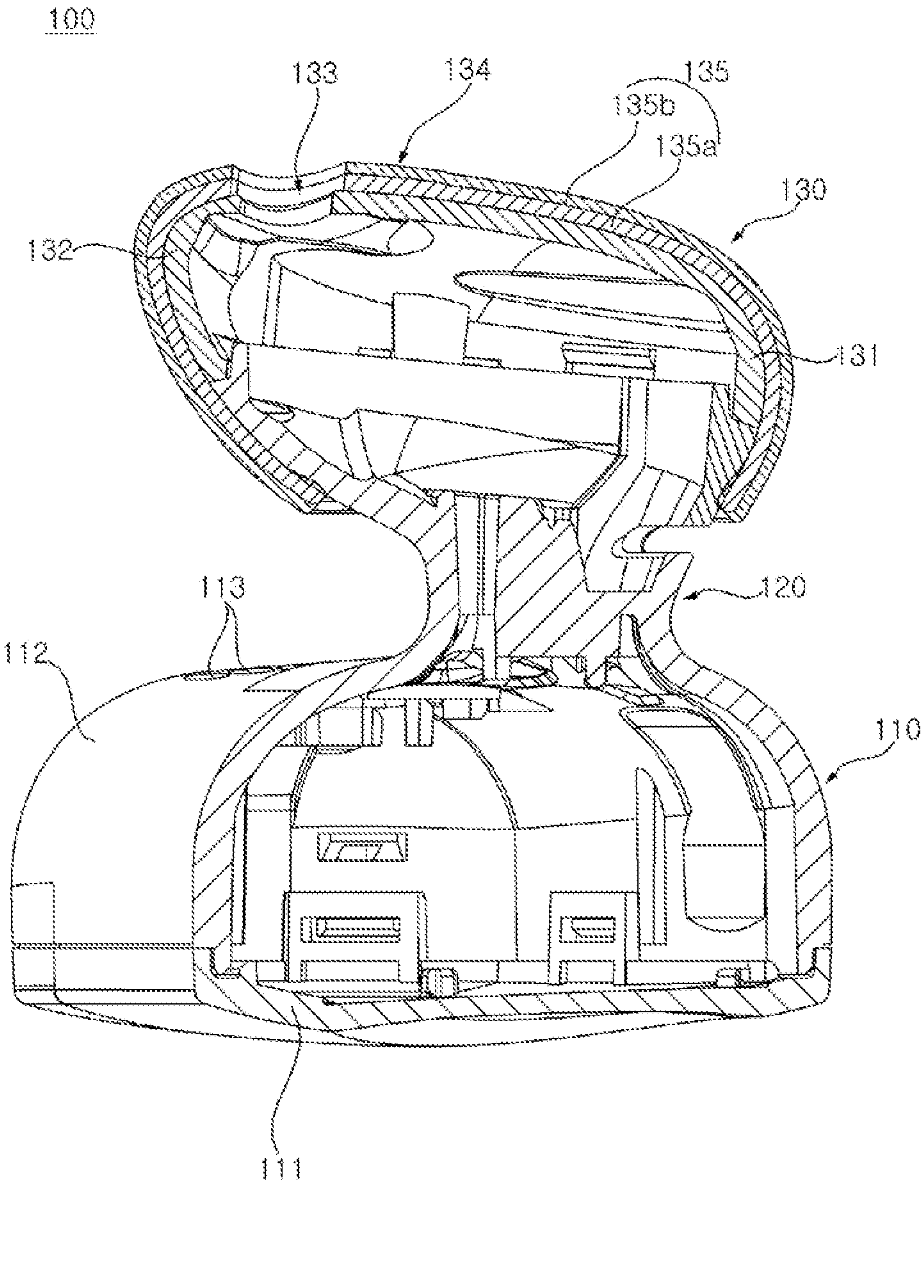

[FIG. 4]
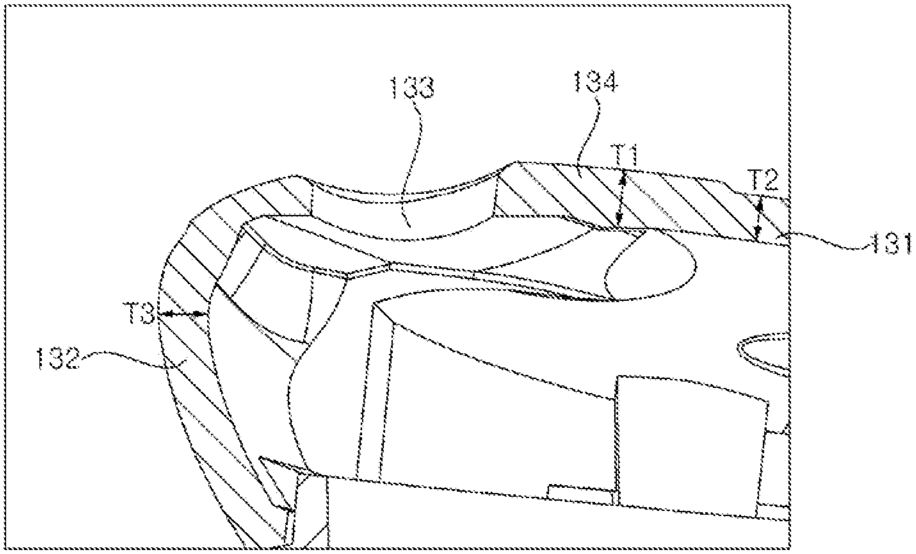

[FIG. 5]
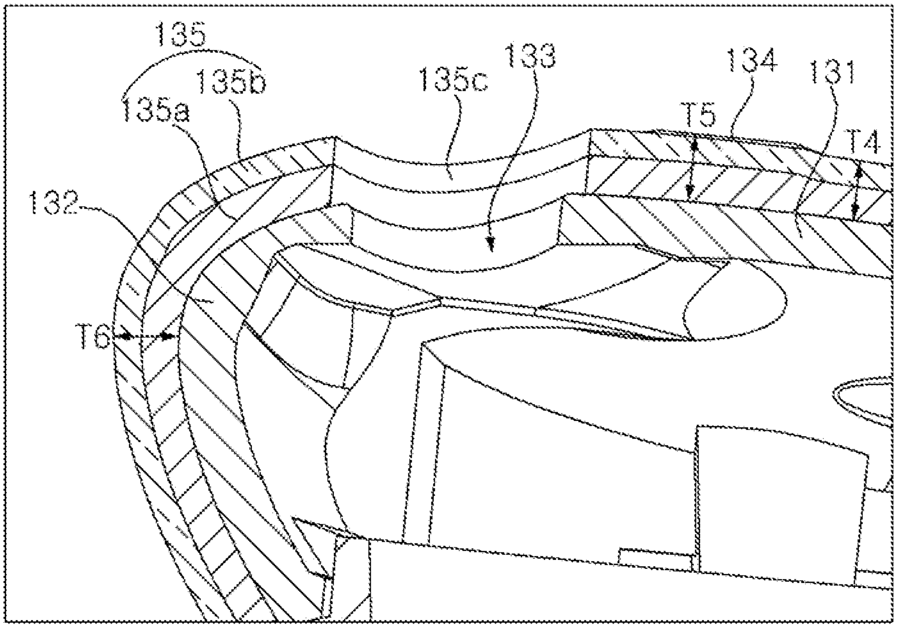

[FIG. 6]
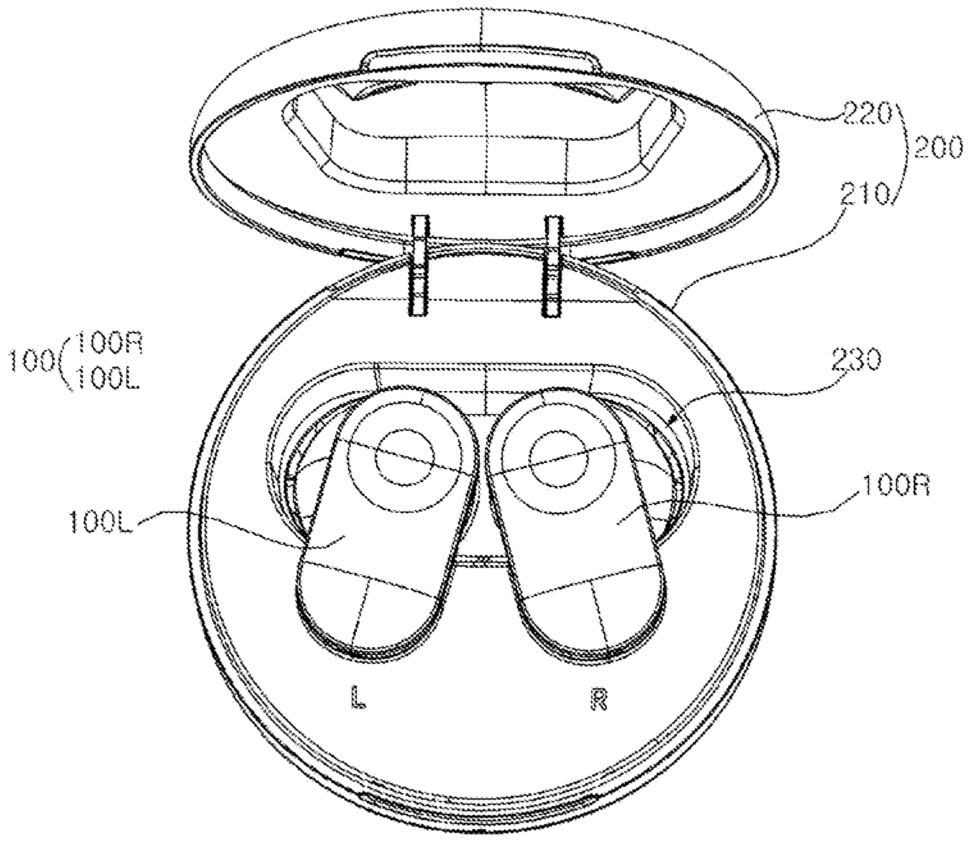

[FIG. 7]
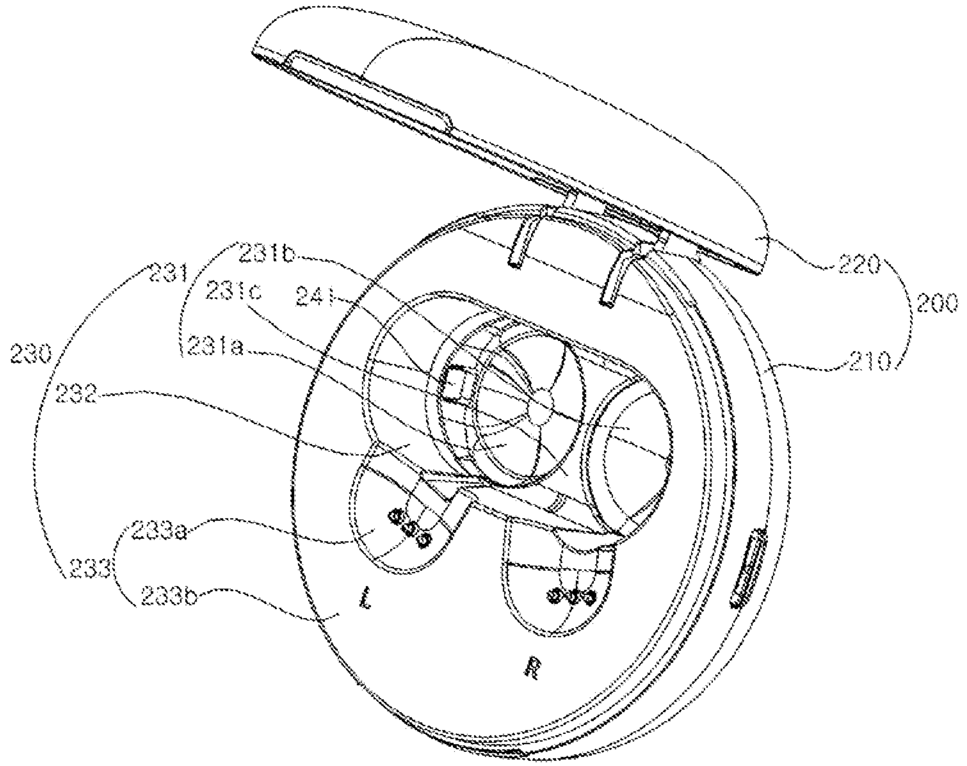

[FIG. 8]
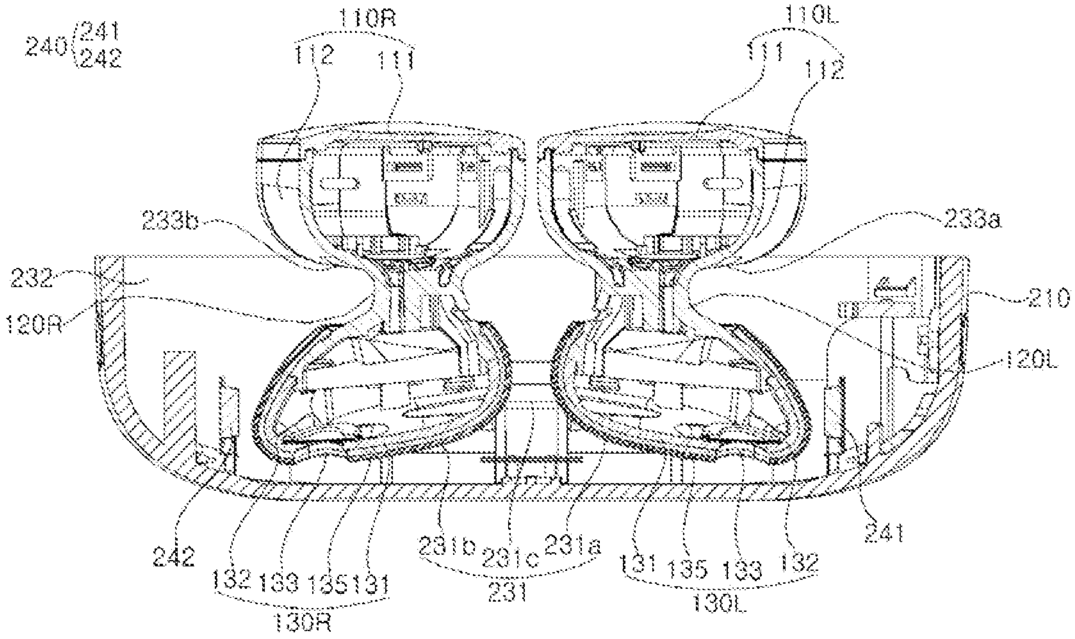

[FIG. 9]
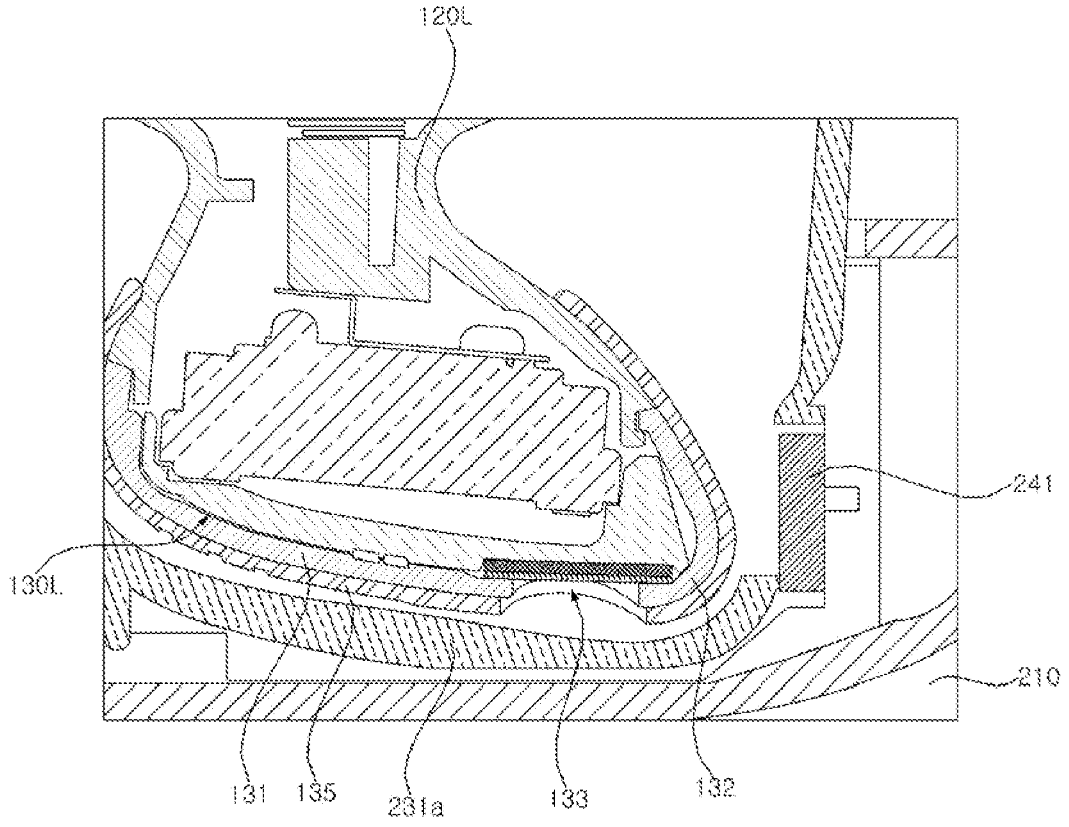

[FIG. 10]
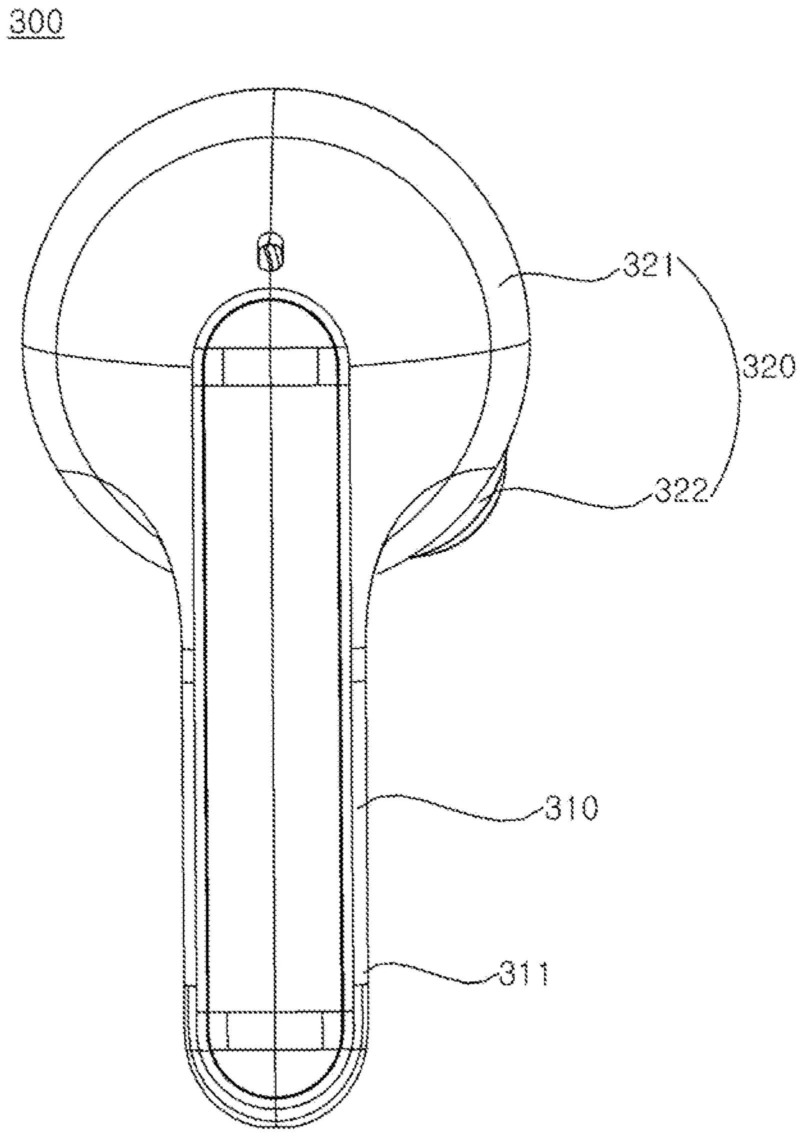

[FIG. 11]
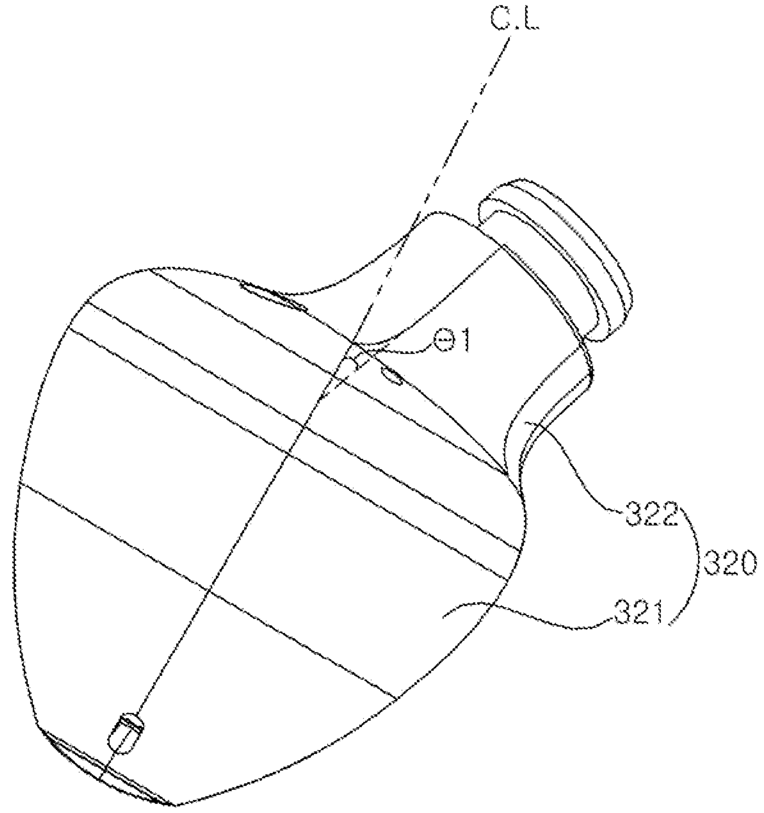

[FIG. 12]
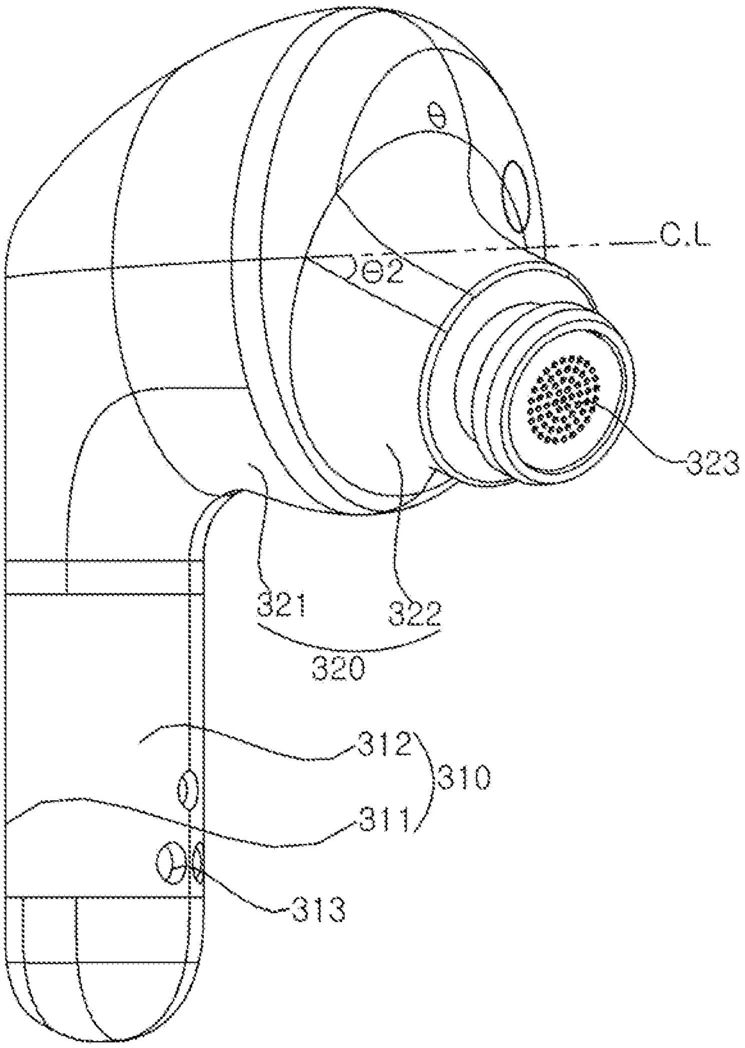

[FIG. 13]
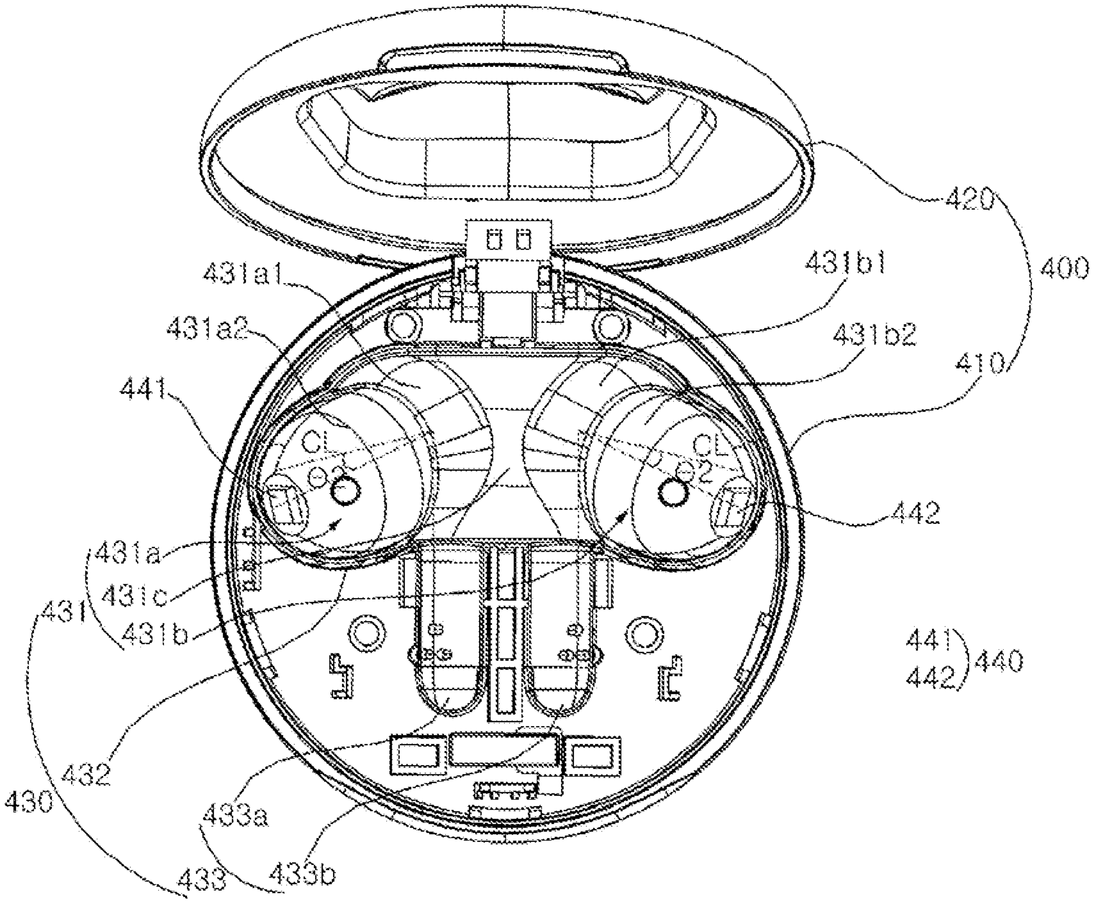

[FIG. 14]
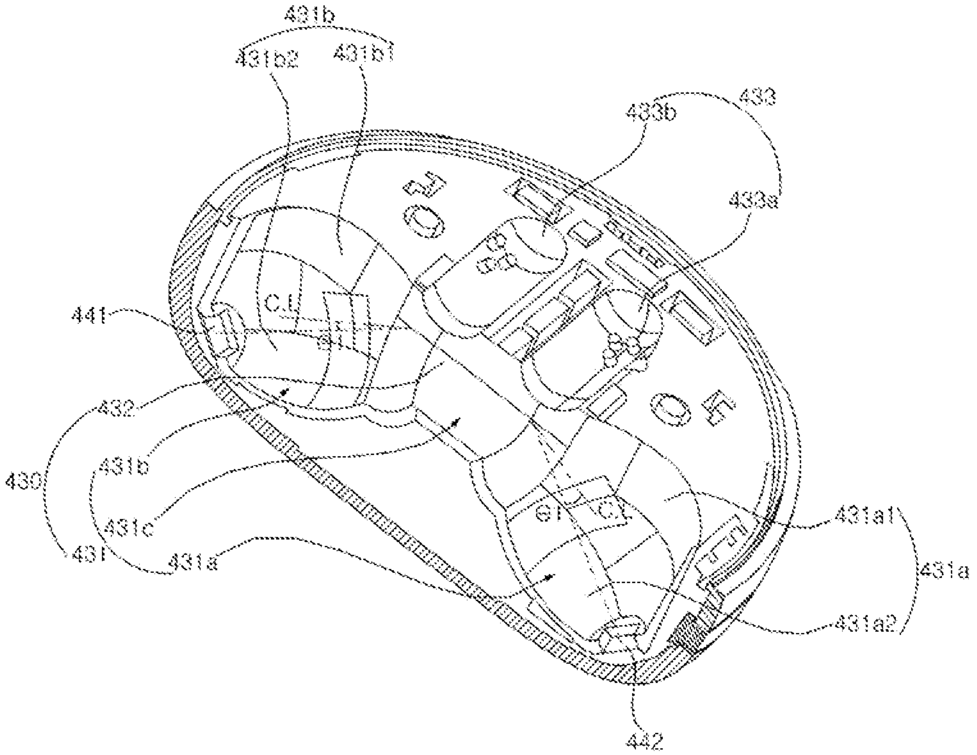

[FIG. 15]
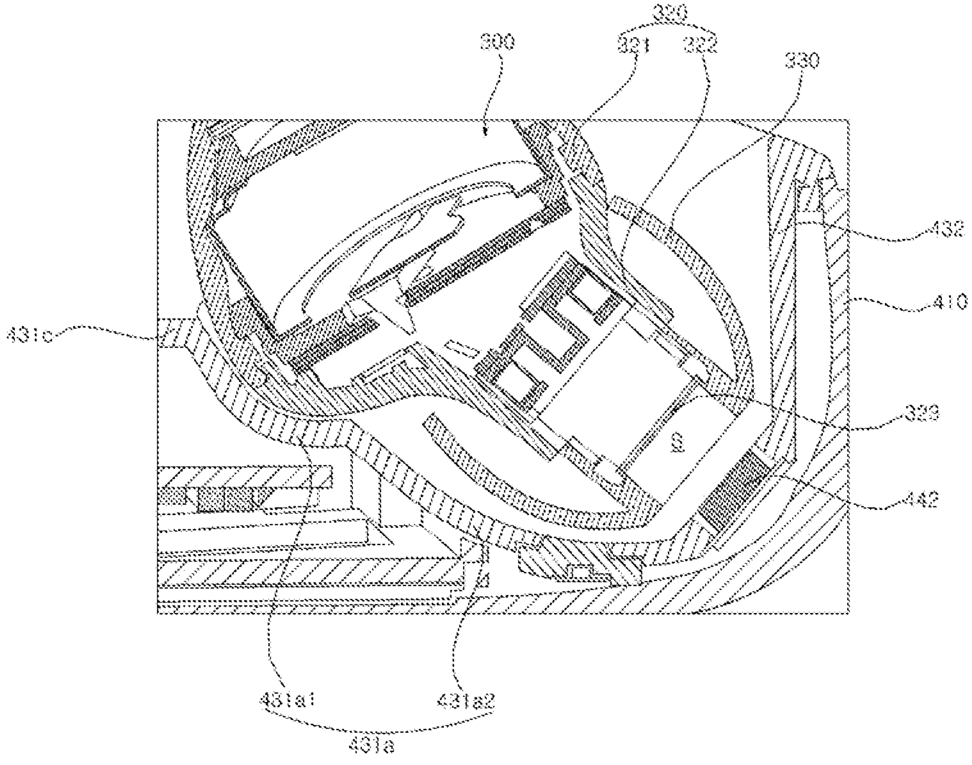

ELECTRONIC DEVICE

CROSS REFERENCE TO RELATED APPLICATIONS

This application is the National Phase of PCT International Application No. PCT/KR2020/001446, filed on Jan. 30, 2020, which claims priority under 35 U.S.C. 119 (a) to Patent Application No. 10-2020-0001644, filed in the Republic of Korea on Jan. 6, 2020, all of which are hereby expressly incorporated by reference into the present application.

TECHNICAL FIELD

The present disclosure relates to an electronic device. Particularly, the present disclosure relates to a wireless earphone.

BACKGROUND ART

An earphone is an electronic device inserted into a user's ear to allow the user to listen to sounds such as music and the like. Examples of the earphone include a wired earphone receiving an input signal through a cable, and a wireless earphone receiving an input signal via wireless communications.

Earphones with a microphone function or buttons for relatively simple control functions, such as volume control, are available in the market. In addition, the wireless earphones have a battery for supplying power for the operation of the earphone, and a wireless earphone case may also be provided for charging the battery.

A user may listen to music and the like by using the wireless earphones, by taking the wireless earphones out of the case and inserting them into the ears. In addition, when the earphones are not in use, the user may put them into the case to charge the battery.

Recently, many studies are conducted to improve the performance of the wireless earphones.

DISCLOSURE

Technical Problem

An object of the present disclosure is to solve the above and other problems.

Another object of the present disclosure is to provide an electronic device capable of improving the quality of sound felt by a user.

Another object of the present disclosure is to provide an electronic device capable of preventing contamination of earphones.

Another object of the present disclosure is to provide an electronic device in which earphones may be easily put in and taken out of a case.

Technical Solution

According to an aspect of the present disclosure for achieving the above or other objects, provided is an electronic device including: a body; a neck formed at one side of the body; and a head formed on the neck, wherein the head includes: a circular part connected to the neck; a protrusion part protruding from one side of the circular part and having a curvature that is greater than a curvature of the circular part; a speaker hole formed at at least one of the circular part and the protrusion part; and a band part formed at a periphery of the speaker hole, wherein a thickness of the band part is greater than a thickness of the circular part or the protrusion part around the band part.

According to another aspect of the present disclosure, provided is an electronic device including: a container including a head receiving part and a body receiving part which are recessed from an upper surface of the container; and a cover hingedly connected to the container and opening and closing the head receiving part and the body receiving part, wherein the head receiving part includes: a first head circle part forming a bottom; a second head circle part disposed next to the first head circle part and forming a bottom; and a partitioning part for dividing the first head circle part and the second head circle part, wherein the electronic device further includes: a first light source disposed at the first head circle part; and a second light source disposed at the second head circle part and disposed opposite to the first light source with respect to the partitioning part.

According to another aspect of the present disclosure, provided is an electronic device including: a container including a head receiving part and a body receiving part which are recessed from an upper surface of the container; and a cover hingedly connected to the container and opening and closing the head receiving part and the body receiving part, wherein the head receiving part includes: an ear part receiving part formed adjacent to the upper surface of the container; and a canal part receiving part forming a bottom and connected to the ear part receiving part, wherein the ear part receiving part has a fusiform shape, and the canal part receiving part is tilted with respect to a center axis of the fusiform shape.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

Advantageous Effects

According to at least one of embodiments of the present disclosure, an electronic device capable of improving the quality of sound felt by a user may be provided.

According to at least one of the embodiments of the present disclosure, an electronic device capable of preventing contamination of earphones may be provided.

According to at least one of the embodiments of the present disclosure, an electronic device in which earphones may be easily put in and taken out of a case may be provided.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

DESCRIPTION OF DRAWINGS

FIGS. 1 to 15 are diagrams illustrating examples of an electronic device according to embodiments of the present disclosure.

MODE FOR DISCLOSURE

Hereinafter, embodiments of the present disclosure will be described in detail with reference to the accompanying drawings, in which the same or similar elements are designated by the same reference numerals, and a redundant description thereof will be omitted.

The terms "module" and "unit" for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings, and the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

Referring to FIGS. 1 to 3, a wireless earphone 100 may include a body 110, a neck 120, and a head 130. The body 110 may have both ends which are elongated and rounded. A first surface 111 of the body 110 is close to a flat surface, and a second surface 112 of the body 110 is close to a curved surface. The first surface 111 and the second surface 112 may be disposed opposite to or face each other. The neck 120 may be formed on the second surface 112. The head 130 may be formed on the neck 120. The neck 120 may have an hourglass shape for smoothly connecting the head 130 and the body 110.

The head 130 may have a generally circular shape. The head 130 may have a circular part 131 and a protrusion part 132. The circular part 131 may have a curved disc shape. The protrusion part 132 may be formed on one side of the circular part 131 and may protrude from the circular part 131. The protrusion part 132 may have a curvature that is greater than a curvature of the circular part 132. Accordingly, the head 130 may be inserted deep into a user's ear.

The head 130 may have a speaker hole 133. The speaker hole 133 may be formed in the circular part 131 and/or the protrusion part 132. The speaker hole 133 may have a linear portion 133*b* and a curved portion 133*a*. The curved portion 133*a* may be connected to both ends of the linear portion 133*b*. The curved portion 133*a* may be near an outline of the protrusion part 132, and the linear portion 133*b* may be near the circular part 131. A band part 134 may be formed around a periphery of the linear part 133*b* and the curved part 133*a* of the speaker hole 133. The band part 134 may be formed with a constant width around the periphery of the speaker hole 133.

A charging terminal 113 may be formed on the second surface 112 of the body 110. There may be a plurality of charging terminals 113.

Referring to FIGS. 3 and 4, a thickness T1 of the band part 134 may be greater than thicknesses T2 and T3 of the protrusion part 132 or the circular part 131. The band part 134 may be stepped with respect to or may protrude slightly from an outer surface of the head 130. Accordingly, a user may listen to sounds provided through the speaker hole 133 of the earphone 100 with a greater sense of realism.

Referring to FIGS. 3 and 5, a cap 135 may cover the head 130. The cap may have an opening 135*c* formed at a position corresponding to the speaker hole 133. The cap 135 may come into contact with the outer surface of the head 130. The cap 135 may have a first layer 135*a* and a second layer 135*b*. For example, the first layer 135*a* may include a material having a high friction coefficient, and the second layer 135*b* may include a material having a low friction coefficient. In another example, the first layer 135*a* and the second layer 135*b* may be formed as a single layer, with an inner surface including a material having a high friction coefficient, and an outer surface including a material having a low friction coefficient.

A thickness T5 of the cap 135 positioned on the band part 134 may be greater than thicknesses T4 and T6 of the cap 135 positioned on the protrusion part 132 or the circular part 131. The cap 135 positioned on the band part 134 may protrude slightly from an outer surface of the cap 135, compared to the cap 135 positioned on the protrusion part 132 or the circular part 131. Accordingly, the cap 135 may be easily inserted into a user's ear without being separated from the head 130, and the user may listen to the sound provided through the speaker hole 133 of the earphone 100 with a greater sense of realism.

Referring to FIGS. 6 and 7, the wireless earphone 100 may be received in a case 200. The wireless earphone 100 may include a first earphone 100L and a second earphone 100R which form a pair. The case 200 may include a container 210 and a cover 220. The container 210 may have a receiving groove 230.

The receiving groove 230, formed in the container 210, may be recessed from an upper surface toward a lower surface of the container 210. The receiving groove 230 has a shape corresponding to a shape of the earphone 100, such that the earphone 100 may be inserted into the receiving groove 230. The cover 220 may be hingedly coupled to the container 210 to cover the receiving groove 230 and the earphone 100 inserted into the receiving groove 230.

Referring to FIGS. 7 and 8, the receiving groove 230 may include head receiving parts 231 and 232 and a body receiving part 233. The head receiving parts 231 and 232 may receive both a head 130L of the first earphone 100L and a head 130R of the second earphone 100R. The case 200 may have a generally circular shape.

The head receiving parts 231 and 232 may be elongated in a diametral direction of the container 210. The body receiving part 233 may cross the head receiving parts 231 and 232. A first body receiving part 233*a* may be disposed on one side of the head receiving parts 231 and 232 in a direction crossing a longitudinal direction of the head receiving parts 231 and 232. A second body receiving part

233*b* may be neighbored to the first body receiving part 233*a* and may be disposed on one side of the head receiving parts 231 and 232 in the direction crossing the longitudinal direction of the head receiving parts 231 and 232.

The head receiving parts 231 and 232 may have a bottom 231 and a lateral surface 232. The bottom 231 may include a first head circle part 231*a*, a second head circle part 231*b*, and a partitioning part 231*c*. The head 130L of the first earphone 100L may be placed on the first head circle part 231*a*, and the head 130R of the second earphone 100R may be placed on the second head circle part 231*b*. The partitioning part 231*c* may be disposed between the first head circle part 231*a* and the second head circle part 231*b*. The lateral surface 232 may form a wall around a circumference of the first head circle part 231*a*, the partitioning part 231*c*, and the second head circle part 231*b*.

A first light source 241 may be mounted on a lateral surface of the first head circle part 231*a*, and a second light source 242 may be formed on a lateral surface of the second head circle part 231*b*. The first light source 241 may face the second light source 242. For example, the light source 240 may be an UVC LED providing light with a wavelength of 275 nm. In another example, the light source 240 may be a Blue LED providing light with a wavelength of 405 nm.

When the cover 220 covers the container 210, power may be supplied to the light source 240. A time period during which power is supplied to the light source 240 may be, for example, about 10 minutes. The power may be supplied to the light source 240 when a charging cable is connected to the container and the earphone 100 is being charged.

Referring to FIGS. 8 and 9, when the earphone 100 is received in the container 210, bodies 110L and 110R may be disposed in the body receiving parts 233*a* and 233*b*, and the heads 130L and 130R may be disposed in the head receiving parts 231 and 232. The protrusion part 132 of the head 130L of the first earphone 100L may face the first light source 241, and the protrusion part 132 of the head 130R of the second earphone 100R may face the second light source 242. Accordingly, the heads 130L and 130R of the earphone may be disinfected.

Referring to FIGS. 10 to 12, a wireless earphone 300 may include a body 310 and a head 320. The body 310 may have both ends which are elongated and rounded. A first surface 311 of the body 310 may be a flat surface, and a second surface 312 of the body 310 may be a curved surface. The first surface 311 and the second surface 312 may be disposed opposite to or face each other. The head 320 may be formed on a second surface 312 of the body 310.

The head 320 may have a generally fusiform shape or bell shape. The head 320 may have an ear part 321 and a canal part 322. The ear part 321 may have a fusiform shape or a bell shape having a curved surface. The canal part 322 may be formed on one side of the ear part 321, and may protrude from the ear part 321 and may be elongated. A speaker hole 323 may be formed in an end surface of the canal part 322. Accordingly, the speaker hole 232 may be inserted deep into a user's ear. A charging terminal 313 may be formed on the second surface 312 of the body 310. There may be a plurality of charging terminals 313.

Referring to FIG. 11, the canal part 322 may be tilted with respect to a center axis CL of the ear part 321. The canal part 322 may be tilted leftward and rightward with respect to the center axis CL of the ear part 321. For example, the canal part 322 may be tilted rightward with respect to the center axis CL of the ear part 321. A tilting angle theta1 may be in a range of 5 to 30 degrees.

Referring to FIG. 12, the canal part 322 may be tilted with respect to the center axis CL of the ear part 321. The canal part 322 may be tilted upward and downward with respect to the center axis CL of the ear part 321. For example, the canal part 322 may be tilted downward with respect to the center axis CL of the ear part 321. A tilting angle theta2 may be in a range of 10 to 45 degrees.

Referring to FIGS. 13 and 14, a case 400 may include a container 410 and a cover 420. The container 410 may have a receiving groove 430. The receiving groove 430, formed in the container 410 may be recessed from an upper surface toward a lower surface of the container 410. The receiving groove 430 has a shape corresponding to a shape of the earphone 300 (see FIG. 12), such that the earphone 300 may be inserted into the receiving groove 430. The cover 420 may be hingedly coupled to the container 410 to cover the receiving groove 430 and the earphone 300 inserted into the receiving groove 430.

The receiving groove 430 may include head receiving parts 431 and 432 and a body receiving part 433. The head receiving parts 431 and 432 may receive both heads 320 of a pair of earphones 300. The case 400 may have a generally circular shape. The head receiving parts 431 and 432 may be recessed longitudinally in the container 410. For example, the head receiving parts 431 and 432 may have a fusiform shape.

The body receiving part 433 may cross the head receiving parts 431 and 432. A first body receiving part 433*a* may be formed on one side of the head receiving parts 431 and 432 in a direction crossing a longitudinal direction of the head receiving parts 431 and 432. A second body receiving part 433*b* may be neighbored to the first body receiving part 433*a* and may be disposed on one side of the head receiving parts 431 and 432 in the direction crossing the longitudinal direction of the head receiving parts 431 and 432.

The head receiving parts 431 and 432 may have a bottom 431 and a lateral surface 432. The bottom 231 may include a first head circle part 431*a*, a second head circle part 431*b*, and a partitioning part 431*c*. The head 320 of the first earphone 300 may be placed on the first head circle part 431*a*, and the head 320 of the second earphone 300 may be placed on the second head circle part 431*b*. The partitioning part 431*c* may be disposed between the first head circle part 431*a* and the second head circle part 431*b*. The lateral surface 432 may form a wall around a circumference of the first head circle part 431*a*, the partitioning part 431*c*, and the second head circle part 431*b*.

A first light source 441 may be mounted to a bottom surface of the first head circle part 431*a*, and a second light source 442 may be mounted to a bottom surface of the second head circle part 431*b*. For example, the light source 440 may be an UVC LED providing light with a wavelength of 275 nm. In another example, the light source 440 may be a Blue LED providing light with a wavelength of 405 nm.

Power may be supplied when the cover 420 covers the container 410. A time period during which power is supplied to the light source 440 may be, for example, about 10 minutes. The power may be supplied to the light source 440 when a charging cable is connected to the container 410 and the earphone 300 is being charged.

Referring to FIG. 13, the head receiving parts 431 and 432 may include ear part receiving parts 431*a*1 and 431*b*1 and canal part receiving parts 431*a*2 and 431*b*2. The canal part receiving parts 431*a*2 and 431*b*2 may be tilted with respect to a center axis CL of the ear part receiving parts 431*a*1 and 431*b*1. The canal part receiving parts 431*a*2 and 431*b*2 may be tilted in a clockwise or counterclockwise direction with respect to the center axis CL of the ear part receiving parts 431*a*1 and 431*b*1. For example, a tilting angle theta2 may be in a range of 10 to 45 degrees.

Referring to FIG. 14, the head receiving parts 431 and 432 may include the ear part receiving parts 431*a*1 and 431*b*1 and the canal part receiving parts 431*a*2 and 431*b*2. The canal part receiving parts 431*a*2 and 431*b*2 may be tilted with respect to the center axis CL of the ear part receiving parts 431*a*1 and 431*b*1. The canal part receiving parts 431*a*2 and 431*b*2 may be tilted in a clockwise or counterclockwise direction with respect to the center axis CL of the ear part receiving parts 431*a*1 and 431*b*1. For example, a tilting angle theta1 may be in a range of 5 to 30 degrees.

Referring to FIGS. 14 and 15, when the earphone 300 is received in the container 410, the body 310 may be disposed in the body receiving part 433, and the head 320 may be disposed in the head receiving parts 431 and 432. An ear cap 330 may be inserted into the canal part 322. A space S may be formed between the ear cap 330 and the speaker hole 323. A foreign material may be filled or may remain in the space S. The speaker hole 323 of the canal part 322 of the head 320 of the earphone 300 may face the first light source 441 and/or the second light source 442. Accordingly, the space S between the canal part 322, in which the speaker hole 323 is formed, and the ear cap 330 may be disinfected.

According to an aspect of the present disclosure, there is provided an electronic device including: a body; a neck formed at one side of the body; and a head formed on the neck, wherein the head includes: a circular part connected to the neck; a protrusion part protruding from one side of the circular part and having a curvature that is greater than a curvature of the circular part; a speaker hole formed at at least one of the circular part and the protrusion part; and a band part formed at a periphery of the speaker hole, wherein a thickness of the band part is greater than a thickness of the circular part or the protrusion part around the band part.

According to another aspect of the present disclosure, the speaker hole may include: a curved portion disposed adjacent to the protrusion part; and a linear portion connected to the curved portion, wherein the band part may be formed corresponding to the curved portion and the linear portion of the speaker hole.

According to yet another aspect of the present disclosure, a cap covering the head may be further included, the cap including an opening formed at a position corresponding to the speaker hole, wherein a thickness of the cap positioned on the band part of the head may be greater than a thickness of the cap positioned on the circular part or the protrusion part.

According to yet another aspect of the present disclosure, a friction coefficient of an inner surface of the cap that contacts the head may be higher than a friction coefficient of an outer surface thereof.

According to yet another aspect of the present disclosure, the cap may include: a first layer having an inner surface that contacts an outer surface of the head; and a second layer having an inner surface that contacts an outer surface of the first layer, wherein a friction coefficient of the first layer may be higher than a friction coefficient of the second layer.

According to yet another aspect of the present disclosure, there is provided an electronic device including: a container including a head receiving part and a body receiving part which are recessed from an upper surface of the container; and a cover hingedly connected to the container and opening and closing the head receiving part and the body receiving part, wherein the head receiving part includes: a first head circle part forming a bottom; a second head circle part disposed next to the first head circle part and forming a bottom; and a partitioning part for dividing the first head circle part and the second head circle part, wherein the electronic device further includes: a first light source disposed at the first head circle part; and a second light source disposed at the second head circle part and disposed opposite to the first light source with respect to the partitioning part.

According to yet another aspect of the present disclosure, the first light source and the second light source may provide light with a wavelength of 275 nm or 405 nm.

According to yet another aspect of the present disclosure, a head placed on the first head circle part may be further included, wherein the head may include: a circular part; a protrusion part protruding from one side of the circular part, and having a greater curvature than a curvature of the circular part; and a speaker hole formed at at least one of the circular part and the protrusion part, wherein the first light source may provide light to the protrusion part of the head.

According to yet another aspect of the present disclosure, there is provided an electronic device including: a container including a head receiving part and a body receiving part which are recessed from an upper surface of the container; and a cover hingedly connected to the container and opening and closing the head receiving part and the body receiving part, wherein the head receiving part may include: an ear part receiving part formed adjacent to the upper surface of the container; and a canal part receiving part forming a bottom and connected to the ear part receiving part, wherein the ear part receiving part may have a fusiform shape, and the canal part receiving part may be tilted with respect to a center axis of the fusiform shape.

According to yet another aspect of the present disclosure, a light source disposed at the canal part receiving part may be further included, wherein the light source may provide light with a wavelength of 275 nm or 405 nm.

According to yet another aspect of the present disclosure, there are included: a head having an ear part placed on the ear part receiving part, and a canal part tilted from the ear part, extending from the ear part, and placed on the canal part receiving part; a speaker hole formed at an end of the canal part; and an ear cap inserted into the canal part, surrounding the speaker hole, and providing a space in front of the speaker hole, wherein the light source may provide light to the speaker hole and the space provided by the ear cap.

Certain embodiments or other embodiments of the invention described above are not mutually exclusive or distinct from each other. Any or all elements of the embodiments of the invention described above may be combined or combined with each other in configuration or function.

For example, a configuration “A” described in one embodiment of the invention and the drawings and a configuration “B” described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An electronic device comprising:

a container including:

an ear receiving part recessed from an upper surface of the container; and a canal receiving part recessed from the ear receiving part;

an earphone including:

an ear part positioned on the ear receiving part;

a canal part protruding from the ear part and positioned in the canal receiving part; and a speaker hole positioned at an end of the canal part;

a light source positioned at the canal receiving part and facing the speaker hole; and a cover hingedly connected to the container to open or close the container, wherein the canal receiving part includes a hole formed through an inclined portion of the canal receiving part and at which the light source is positioned.

2. The electronic device of claim 1, wherein the light source provides light with a wavelength of 275 nm or 405 nm.

3. The electronic device of claim 1, wherein a center axis of the canal part is tilted with respect to a center axis of the ear part, and wherein the speaker hole and the light source are aligned with the center axis of the canal part.

4. The electronic device of claim 1, further including an ear cap in which the canal part is positioned and that defines a space between the light source and the speaker hole, wherein a gap surrounding the ear cap is formed between an outer surface of the ear cap and a boundary surface of the canal receiving part.

5. The electronic device of claim 1, wherein the canal part is adjacent to a lateral edge of the ear part, and wherein a portion of the canal part positioned in the canal receiving part is exposed between the container and the cover without being covered by the ear part positioned on the ear receiving part.

6. The electronic device of claim 1, wherein the container includes:

a first ear receiving part including the ear receiving part and the canal receiving part;

a second ear receiving part including the ear receiving part and the canal receiving part, and disposed next to the first ear receiving part;

a partitioning part separating the first ear receiving part and the second ear receiving part;

a first body receiving part recessed from the upper surface of the container and connected to the ear receiving part of the first ear receiving part; and a second body receiving part recessed from the upper surface of the container and connected to the ear receiving part of the second ear receiving part.

7. An electronic device comprising:

a container including:

an ear receiving part recessed from an upper surface of the container; and a canal receiving part recessed from the ear receiving part;

an earphone including:

an ear part positioned on the ear receiving part;

a canal part protruding from the ear part and positioned in the canal receiving part; and a speaker hole positioned at an end of the canal part;

a light source positioned at the canal receiving part and facing the speaker hole;

a cover hingedly connected to the container to open or close the container; and an ear cap in which the canal part is positioned and that defines a space between the light source and the speaker hole, wherein a gap surrounding the ear cap is formed between an outer surface of the ear cap and a boundary surface of the canal receiving part.

8. The electronic device of claim 7, wherein the light source provides light with a wavelength of 275 nm or 405 nm.

9. The electronic device of claim 7, wherein a center axis of the canal part is tilted with respect to a center axis of the ear part, and wherein the speaker hole and the light source are aligned with the center axis of the canal part.

10. The electronic device of claim 7, wherein the canal receiving part includes a hole formed through an inclined portion of the canal receiving part and at which the light source is positioned.

11. The electronic device of claim 7, wherein the canal part is adjacent to a lateral edge of the ear part, and wherein a portion of the canal part positioned in the canal receiving part is exposed between the container and the cover without being covered by the ear part positioned on the ear receiving part.

12. The electronic device of claim 7, wherein the container includes:

a first ear receiving part including the ear receiving part and the canal receiving part;

a second ear receiving part including the ear receiving part and the canal receiving part, and disposed next to the first ear receiving part;

a partitioning part separating the first ear receiving part and the second ear receiving part;

a first body receiving part recessed from the upper surface of the container and connected to the ear receiving part of the first ear receiving part; and a second body receiving part recessed from the upper surface of the container and connected to the ear receiving part of the second ear receiving part.

* * * * *